United States Patent
Cruz et al.

(10) Patent No.: US 6,852,800 B2
(45) Date of Patent: Feb. 8, 2005

(54) PLASTIC COMPOSITION

(75) Inventors: Carlos Alfonso Cruz, Holland, PA (US); Robert Howard Gore, Southampton, PA (US); Timothy Roger Lynn, Hackettstown, NJ (US); Warren Harvey Machleder, Blue Bell, PA (US); Jane Elizabeth Weier, Hopewell, NJ (US); Newman Mayer Bortnick, Sarasota, FL (US)

(73) Assignee: Rohm and Haas Company, Philadelphia, PA (US)

( * ) Notice: Subject to any disclaimer, the term of this patent is extended or adjusted under 35 U.S.C. 154(b) by 380 days.

(21) Appl. No.: 10/097,260

(22) Filed: Mar. 15, 2002

(65) Prior Publication Data

US 2002/0193521 A1 Dec. 19, 2002

Related U.S. Application Data

(60) Provisional application No. 60/280,418, filed on Mar. 30, 2001.

(51) Int. Cl.$^7$ ............................................. C08F 236/02
(52) U.S. Cl. ............................ 525/86; 525/55; 524/502
(58) Field of Search ...................... 525/86, 55; 524/502

(56) References Cited

U.S. PATENT DOCUMENTS

4,116,909 A * 9/1978 Muller ........................ 523/351
6,525,139 B2 * 2/2003 Takesue et al. ............. 525/201

FOREIGN PATENT DOCUMENTS

| EP | 0392767 A2 | 4/1990 |
| EP | 1022115 A1 | 1/2000 |
| WO | WO 00/75244 A1 | 12/2000 |

* cited by examiner

*Primary Examiner*—David W. Wu
*Assistant Examiner*—Satya Sastri
(74) *Attorney, Agent, or Firm*—Ronald D. Bakule; Marcella M. Bodner

(57) ABSTRACT

Plastics and plastics additives including PNPs having a mean diameter in the range of from 1 to 50 nanometers, the PNPs including as polymerized units at least one multi-ethylenically-unsaturated monomer are provided. Also provided is a method for providing an improved plastic.

9 Claims, No Drawings

PLASTIC COMPOSITION

CROSS-REFERENCE TO RELATED PATENT APPLICATIONS

This is a non-provisional application of prior pending U.S. provisional application Ser. No. 60/280,418 filed Mar. 30, 2001.

This invention relates to plastic compositions. In particular, this invention relates to thermoplastic and thermosetting compositions which contain crosslinked polymeric nanoparticles (hereinafter "PNPs") having a diameter of 1 to 50 nanometers, the PNPs including as polymerized units at least one multi-ethylenically-unsaturated monomer. The PNPs impart improved properties to plastics. This invention also relates to a method for providing an plastics compositions including PNPs.

Thermoplastic and thermosetting resins are used for preparing a multitude of useful plastic materials. Thermoplastic and thermosetting resins can be used alone or in combination with other materials to form composites. As more plastic materials and composites are being used to replace traditional materials, such as metal, cement, and steel for preparing useful articles, plastic materials having improved mechanical properties are sought. Because many plastics often are brittle or lack in sufficient strength, there is also a continuing need to improve the mechanical properties of plastics using suitable additive materials (i.e., plastics additives).

One type of plastics additives that is useful for modifying plastics includes polymer particles. Latex-based emulsion polymer particles are often used for modifying the mechanical and melt processing properties of thermoplastic and thermosetting resins. For example, polyvinyl chloride resin (hereafter "PVC") has a combination of properties that make it particularly suitable for use as a structural material but suffers from being brittle. Blending PVC with polymer particles having a rubber phase improves the impact strength (e.g., as an impact-modifier). However, there is a continuing need to improve the properties and performance of plastics additives, such as polymer particle plastics additives.

WO 200075244 discloses binding agents formed by reacting one or more epoxide-functional binding agents with carboxyl functional metal-organic PNPs having a mean particle size of 5 to 200 nanometers.

It is desired to provide plastic compositions having improved processing and mechanical properties. It has now been found that such improvements can be obtained by including PNPs in plastic compositions. The PNPs used in the present invention have a diameter of 1 to 50 nanometers, the PNPs including as polymerized units at least one multi-ethylenically-unsaturated monomer.

In a first aspect of the present invention there is provided a plastic composition including at least one plastic resin and PNPs, said PNPs having a mean diameter in the range of from 1 to 50 nanometers, said PNPs including as polymerized units at least one multi-ethylenically-unsaturated monomer.

In a second aspect of the present invention there is a method for providing a plastic composition, including the steps of: forming PNPs having a mean diameter in the range of from 1 to 50 nanometers, said PNPs comprising as polymerized units at least one multi-ethylenically-unsaturated monomer; and combining said PNPs with at least one plastic resin.

In a third aspect of the present invention there is provided a plastics additive composition, including: at least one plastics additive and PNPs, said PNPs having a mean diameter in the range of from 1 to 50 nanometers, said PNPs comprising as polymerized units at least on multi-ethylenically-unsaturated monomer.

As used herein, the following abbreviations shall have the following meanings, unless the context clearly indicates otherwise: C=centigrade; μm=micron; UV=ultraviolet; rpm=revolutions per minute; nm=nanometer; J=joules; cc=cubic centimeter; g=gram; wt %=weight percent; L=liter; mL=milliliter; pphr=parts per hundred parts of resin, by weight; MIAK=methyl iso-amyl ketone; MIBK=methyl iso-butyl ketone; PMA=poly(methyl acrylate); CyHMA=cyclohexylmethacrylate; EG=ethyleneglycol; DPG=dipropyleneglycol; DEA=diethyleneglycol ethyl ether acetate; BzA=benzyl acrylate; BzMA=benzyl methacrylate; MAPS=MATS=(trimethoxylsilyl)propyl methacrylate; PETTA=pentaerythritol tetra/triacrylate; PPG4000DMA=polypropyleneglycol 4000 dimethacrylate; DPEPA=dipentaerythritol pentaacrylate; TMSMA=trimethylsilyl methacrylate; MOPTSOMS=methacryloxypropylbis(trimethylsiloxy)methylsilane; MOPMDMOS=3-methacryloxypropylmethyldimethoxysilane; TAT=triallyl-1,3,5-triazine-2,4,6-(1H,3H,5H)-trione; IBOMA=isobornyl methacrylate; PGMEA=propyleneglycol monomethylether acetate; PEGMEMA 475=poly(ethyleneglycol methyl ether) methacrylate Mw=475; GMA=glycidyl methacrylate; and PGDMA=propyleneglycol dimethacrylate.

The term "(meth)acrylic" includes both acrylic and methacrylic and the term "(meth)acrylate" includes both acrylate and methacrylate. Likewise, the term "(meth)acrylamide" refers to both acrylamide and methacrylamide. "Alkyl" includes straight chain, branched and cyclic alkyl groups.

As used herein, the term "Tg" refers to the glass transition temperature as is determined using differential scanning calorimetry ("DSC") methods.

All ranges defined herein are inclusive and combinable.

The term "or" as used herein includes its inclusive form.

The present invention is directed to plastic compositions which include PNPs having a mean particle mean diameter in the range of from 1 to 50 nanometers, the PNPs comprising as polymerized units at least one multi-ethylenically-unsaturated monomer.

The PNPs are formed by the free radical polymerization of at least one multi-ethylenically-unsaturated monomer. Typically, the PNPs contain at least 1% by weight based on the weight of the PNPs, of at least one polymerized multi-ethylenically-unsaturated monomer. Up to and including 100% polymerized multi-ethylenically-unsaturated monomer, based on the weight of the PNPs, can be effectively used in the particles of the present invention. It is preferred that the amount of polymerized multi-ethylenically-unsaturated monomer is from about 1% to about 80% based on the weight of the PNPs, more preferably from about 1% to about 60% based on the weight of the PNPs, and most preferably from 1% to 25% based on the weight of the PNPs.

Suitable multi-ethylenically-unsaturated monomers useful in the present invention include di-, tri-, tetra-, or higher multi-functional ethylenically unsaturated monomers such as, for example, trivinylbenzene, divinyltoluene, divinylpyridine, divinylnaphthalene and divinylxylene; and such as ethyleneglycol diacrylate, trimethylolpropane triacrylate, diethyleneglycol divinyl ether, trivinylcyclohexane, allyl methacrylate ("ALMA"), ethyleneglycol dimethacrylate ("EGDMA"), diethyleneglycol dimethacrylate ("DEGDMA"), propyleneglycol dimethacrylate, propyleneglycol diacrylate, trimethylolpropane trimethacrylate ("TMPTMA"), divinyl benzene ("DVB"), 2,2-dimethylpropane-1,3-diacrylate, 1,3-butylene glycol diacrylate, 1,3-butyleneglycol dimethacrylate, 1,4-butanediol diacrylate, diethylene glycol diacrylate, diethylene glycol dimethacrylate, 1,6-hexanediol diacrylate, 1,6-hexanediol dimethacrylate, tripropylene glycol diacrylate, triethylene glycol dimethacrylate, tetraethylene glycol diacrylate, polyethylene glycol 200 diacrylate, tetraethylene glycol dimethacrylate, polyethylene glycol dimethacrylate, ethoxylated bisphenol A diacrylate, ethoxylated bisphenol A dimethacrylate, polyethylene glycol 600 dimethacrylate, poly(butanediol) diacrylate, pentaerythritol triacrylate, trimethylolpropane triethoxy triacrylate, glyceryl propoxy triacrylate, pentaerythritol tetraacrylate, pentaerythritol tetramethacrylate, dipentaerythritol monohydroxypentaacrylate, divinyl silane, trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly (vinyl hydro siloxane), poly (phenyl vinyl siloxane) and mixtures thereof.

Suitable ethylenically-unsaturated unsaturated monomers which can be incorporated as copolymerized units in the PNPs include, but are not limited to: (meth)acrylic acid, (meth)acrylamides, alkyl (meth)acrylates, alkenyl (meth) acrylates, aromatic (meth)acrylates, vinyl aromatic monomers, nitrogen-containing compounds and their thio-analogs, and substituted ethylene monomers.

Typically, the alkyl (meth)acrylates useful in the present invention are ($C_1$–$C_{24}$) alkyl (meth)acrylates. Suitable alkyl (meth)acrylates include, but are not limited to, "low cut" alkyl (meth)acrylates, "mid cut" alkyl (meth)acrylates and "high cut" alkyl (meth)acrylates.

"Low cut" alkyl (meth)acrylates are typically those where the alkyl group contains from 1 to 6 carbon atoms. Suitable low cut alkyl (meth)acrylates include, but are not limited to: methyl methacrylate ("MMA"), methyl acrylate, ethyl acrylate, propyl methacrylate, butyl methacrylate ("BMA"), butyl acrylate ("BA"), isobutyl methacrylate ("IBMA"), hexyl methacrylate, cyclohexyl methacrylate, cyclohexyl acrylate and mixtures thereof.

"Mid cut" alkyl (meth)acrylates are typically those where the alkyl group contains from 7 to 15 carbon atoms. Suitable mid cut alkyl (meth)acrylates include, but are not limited to: 2-ethylhexyl acrylate ("EHA"), 2-ethylhexyl methacrylate, octyl methacrylate, decyl methacrylate, isodecyl methacrylate ("IDMA", based on branched ($C_{10}$)alkyl isomer mixture), undecyl methacrylate, dodecyl methacrylate (also known as lauryl methacrylate), tridecyl methacrylate, tetradecyl methacrylate (also known as myristyl methacrylate), pentadecyl methacrylate and mixtures thereof. Useful mixtures include dodecyl-pentadecyl methacrylate ("DPMA"), a mixture of linear and branched isomers of dodecyl, tridecyl, tetradecyl and pentadecyl methacrylates; and lauryl-myristyl methacrylate ("LMA").

"High cut" alkyl (meth)acrylates are typically those where the alkyl group contains from 16 to 24 carbon atoms. Suitable high cut alkyl (meth)acrylates include, but are not limited to: hexadecyl methacrylate, heptadecyl methacrylate, octadecyl methacrylate, nonadecyl methacrylate, cosyl methacrylate, eicosyl methacrylate and mixtures thereof. Useful mixtures of high cut alkyl (meth) acrylates include, but are not limited to: cetyl-eicosyl methacrylate ("CEMA"), which is a mixture of hexadecyl, octadecyl, cosyl and eicosyl methacrylate; and cetyl-stearyl methacrylate ("SMA"), which is a mixture of hexadecyl and octadecyl methacrylate.

The mid-cut and high-cut alkyl (meth)acrylate monomers described above are generally prepared by standard esterification procedures using technical grades of long chain aliphatic alcohols, and these commercially available alcohols are mixtures of alcohols of varying chain lengths containing between 10 and 15 or 16 and 20 carbon atoms in the alkyl group. Examples of these alcohols are the various Ziegler catalyzed ALFOL alcohols from Vista Chemical (now Sasol) Company, i.e., ALFOL 1618 and ALFOL 1620, Ziegler catalyzed various NEODOL alcohols from Shell Chemical Company, i.e. NEODOL 25L, and naturally derived alcohols such as Proctor & Gamble's TA-1618 and CO-1270. Consequently, for the purposes of this invention, alkyl (meth)acrylate is intended to include not only the individual alkyl (meth)acrylate product named, but also to include mixtures of the alkyl (meth)acrylates with a predominant amount of the particular alkyl (meth)acrylate named.

Suitable monomers useful in the present invention also include maleate mono- and dialkyl esters, maleic acid, fumarates, maleamates and their copolymers with vinylaromatics, vinyl ethers, vinyl sulfides, and the like.

The alkyl (meth)acrylate monomers useful in the present invention can be a single monomer or a mixture having different numbers of carbon atoms in the alkyl portion. Also, the (meth)acrylamide and alkyl (meth)acrylate monomers useful in the present invention can optionally be substituted. Suitable optionally substituted (meth)acrylamide and alkyl (meth)acrylate monomers include, but are not limited to: hydroxy ($C_2$–$C_6$)alkyl (meth)acrylates, dialkylamino ($C_2$–$C_6$)-alkyl (meth)acrylates, dialkylamino($C_2$–$C_6$)alkyl (meth)acrylamides.

Useful substituted alkyl (meth)acrylate monomers are those with one or more hydroxyl groups in the alkyl radical, especially those where the hydroxyl group is found at the β-position (2-position) in the alkyl radical. Hydroxyalkyl (meth)acrylate monomers in which the substituted alkyl group is a ($C_2$–$C_6$)alkyl, branched or unbranched, are preferred. Suitable hydroxyalkyl (meth)acrylate monomers include, but are not limited to: 2-hydroxyethyl methacrylate ("HEMA"), 2-hydroxyethyl acrylate ("HEA"), 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate, 2-hydroxybutyl acrylate and mixtures thereof. The preferred hydroxyalkyl (meth)acrylate monomers are HEMA, 1-methyl-2-hydroxyethyl methacrylate, 2-hydroxypropyl methacrylate and mixtures thereof. A mixture of the latter two monomers is commonly referred to as "hydroxypropyl methacrylate" or "HPMA."

Other substituted (meth)acrylate and (meth)acrylamide monomers useful in the present invention are those with a dialkylamino group or dialkylaminoalkyl group in the alkyl radical. Examples of such substituted (meth)acrylates and (meth)acrylamides include, but are not limited to: dimethylaminoethyl methacrylate ("DMAEMA"), dimethylaminoethyl acrylate, N,N-dimethylaminoethyl methacrylamide, N,N-dimethyl-aminopropyl methacrylamide, N,N-dimethylaminobutyl methacrylamide, N,N-diethylaminoethyl methacrylamide, N,N-diethylaminopropyl methacrylamide, N,N-diethylaminobutyl methacrylamide, N-(1,1-dimethyl-3-oxobutyl) acrylamide, N-(1,3-diphenyl-1-ethyl-3-oxobutyl) acrylamide, N-(1-methyl-1-phenyl-3-oxobutyl)

methacrylamide, and 2-hydroxyethyl acrylamide, N-methacrylamide of aminoethyl ethylene urea, N-methacryloxy ethyl morpholine, N-maleimide of dimethylaminopropylamine and mixtures thereof.

Other substituted (meth)acrylate monomers useful in the present invention are silicon-containing monomers such as γ-propyl tri($C_1$–$C_6$)alkoxysilyl (meth)acrylate, γ-propyl tri ($C_1$–$C_6$)alkylsilyl (meth)acrylate, γ-propyl di($C_1$–$C_6$)alkoxy ($C_1$–$C_6$)alkylsilyl (meth)acrylate, γ-propyl di($C_1$–$C_6$)alkyl ($C_1$–$C_6$)alkoxysilyl (meth)acrylate, vinyl tri($C_1$–$C_6$) alkoxysilyl (meth)acrylate, vinyl di($C_1$–$C_6$)alkoxy($C_1$–$C_6$) alkylsilyl (meth)acrylate, vinyl ($C_1$–$C_6$)alkoxydi($C_1$–$C_6$) alkylsilyl (meth)acrylate, vinyl tri($C_1$–$C_6$)alkylsilyl (meth) acrylate, and mixtures thereof.

The vinylaromatic monomers useful as unsaturated monomers in the present invention include, but are not limited to: styrene ("STY"), α-methylstyrene, vinyltoluene, p-methylstyrene, ethylvinylbenzene, vinylnaphthalene, vinylxylenes, and mixtures thereof. The vinylaromatic monomers also include their corresponding substituted counterparts, such as halogenated derivatives, i.e., containing one or more halogen groups, such as fluorine, chlorine or bromine; and nitro, cyano, ($C_1$–$C_{10}$)alkoxy, halo($C_1$–$C_{10}$) alkyl, carb($C_1$–$C_{10}$)alkoxy, carboxy, amino, ($C_1$–$C_{10}$) alkylamino derivatives and the like.

The nitrogen-containing compounds and their thio-analogs useful as unsaturated monomers in the present invention include, but are not limited to: vinylpyridines such as 2-vinylpyridine or 4-vinylpyridine; lower alkyl ($C_1$–$C_8$) substituted N-vinyl pyridines such as 2-methyl-5-vinyl-pyridine, 2-ethyl-5-vinylpyridine, 3-methyl-5-vinylpyridine, 2,3-dimethyl-5-vinylpyridine, and 2-methyl-3-ethyl-5-vinylpyridine; methyl-substituted quinolines and isoquinolines; N-vinylcaprolactam; N-vinylbutyrolactam; N-vinylpyrrolidone; vinylimidazole; N-vinylcarbazole; N-vinylsuccinimide; (meth)acrylonitrile; o-, m-, or p-aminostyrene; maleimide; N-vinyloxazolidone; N,N-dimethyl aminoethyl-vinyl-ether; ethyl-2-cyano acrylate; vinyl acetonitrile; N-vinylphthalimide; N-vinylpyrrolidones such as N-vinyl-thio-pyrrolidone, 3 methyl-1-vinylpyrrolidone, 4-methyl-1-vinylpyrrolidone, 5-methyl-1-vinylpyrrolidone, 3-ethyl-1-vinylpyrrolidone, 3-butyl-1-vinylpyrrolidone, 3,3-dimethyl-1-vinylpyrrolidone, 4,5-dimethyl-1-vinylpyrrolidone, 5,5-dimethyl-1-vinylpyrrolidone, 3,3,5-trimethyl-1-vinylpyrrolidone, 4-ethyl-1-vinylpyrrolidone, 5-methyl-5-ethyl-1-vinylpyrrolidone and 3,4,5-trimethyl-1-vinylpyrrolidone; vinyl pyrroles; vinyl anilines; and vinyl piperidines.

The substituted ethylene monomers useful as unsaturated monomers in the present invention include, but are not limited to: allylic monomers, vinyl acetate, vinylformamide, vinyl chloride, vinyl fluoride, vinyl bromide, vinylidene chloride, vinylidene fluoride and vinylidene bromide.

The PNPs used in the present invention can be prepared by emulsion polymerization, suspension polymerization, non-aqueous dispersion polymerization, or solution polymerization. By "solution polymerization" herein is meant free radical addition polymerization in an aqueous or non-aqueous medium which is a solvent for the polymer. By "solvent for the polymer" herein is meant that the polymer absent crosslinking would be soluble in the polymerization medium, as may be predicted based on the solubility of a polymer made under the same conditions absent the crosslinking monomer for polymers containing less than about 20 wt. % multi-ethylenically unsaturated monomer or by selection of a polymerization medium based on solubility maps as disclosed herein.

The PNPs can be prepared in a non-aqueous solvent. Examples of such solvents include, but are not limited to: hydrocarbons, such as alkanes, fluorinated hydrocarbons, and aromatic hydrocarbons, ethers, ketones, esters, alcohols and mixtures thereof. Particularly suitable solvents include dodecane, mesitylene, xylenes, diphenyl ether, gamma-butyrolactone, ethyl acetate, ethyl lactate, propyleneglycol monomethyl ether acetate, caprolactone, 2-heptanone, methylisobutyl ketone, diisobutylketone, propyleneglycol monomethyl ether, and alkyl alcohols, such as decanol, isopropanol, and t-butanol.

The PNPs can be prepared by first charging a solvent heel or, alternatively, a mixture of solvent and some portion of the monomer(s) to a reaction vessel equipped with a stirrer, a thermometer and a reflux condenser. The monomer charge is typically composed of monomer(s), initiator and chain transfer agent, as appropriate. The solvent or solvent/monomer heel charge is heated with stirring under a nitrogen blanket to a temperature from about 55° C. to about 125° C. After the heel charge has reached a temperature sufficient to initiate polymerization, the monomer charge or balance of the monomer charge is added to the reaction vessel over a period of 15 minutes to 4 hours while maintaining the reaction at the desired reaction temperature. After completing the monomer mixture addition, additional initiator can be charged to the reaction and/or hold periods can be employed.

The PNPs can be prepared by emulsion polymerization. The emulsion polymers useful in the present invention are generally prepared by first charging water and some portion of the monomer emulsion to a reaction vessel equipped with a stirrer, a thermometer and a reflux condenser. Typically, the monomer emulsion is composed of monomer, surfactant, initiator and chain transfer agent, as appropriate. The initial charge of monomer emulsion is typically added to the reaction vessel and heated with stirring under a nitrogen blanket to a temperature of from about 55° C. to about 125° C. to form a seed charge. After the seed charge has reached a temperature sufficient to initiate polymerization, the monomer emulsion or balance of the monomer emulsion is charged to the reaction vessel over a period of 15 minutes to 4 hours while maintaining the reaction at the desired reaction temperature. After completing the monomer emulsion addition, additional initiator can be charged to the reaction and/or hold periods can be employed.

In the alternative, the emulsion polymerization can be carried out in a batch process. In such a batch process, the emulsion polymers are prepared by charging water, monomer, surfactant, initiator and chain transfer agent, as appropriate, to a reaction vessel with stirring under a nitrogen blanket. The monomer emulsion is added to a suitable reactor and heated to a temperature of from about 55° C. to about 125° C. to carry out the polymerization. After completing the monomer emulsion addition, additional initiator can be charged to the reaction and/or hold periods can be employed.

Suitable PNPs include, for example: HEMA/DEGDMA, MMA/DEGDMA, MMA/MAPS/DEGDMA, MMA/MAPS/PETTA, MMA/MAPS/PPG4000DMA, MMA/MAPS/DPEPA, MAPS/DEGDMA, BA/DEGDMA, MMA/MAPS/TMPTMA, MMA/MAPS/DVB, STY/MAPS/DVB, BA/MAPS/DVB, BA/TMSMA/DVB, BA/MOPTSOMS/DVB, BA/MOPMDMOS/DVB, BA/MAPS/TAT, ALMA/BA/DVB, IBOMA/MAPS/DVB, IBOA/MAPS/DVB, BA/DVB, BA/PGDMA, BA/ALMA, BA/TMPTMA, BA/DPEPA, EHA/DVB, EHA/ALMA, EHA/TMPTMA, EHA/DPEPA, STY/DVB, STY/ALMA, EHA/STY/ALMA, MMA/BA/ALMA, STY/MMA/DVB, MMA/butadiene/ STY, MMA/EA/ALMA, BA/ALMA/MATS, STY/MATS/ DVB, MMA/BA/MATS, STY/MMA/MATS/DVB, MMA/ BA/MATS/ALMA, BzA/TMPTMA, BzA/DVB, IDMA/ BzMA and MMA/ALMA/MATS.

Control of particle size and distribution can be achieved by such methods as choice of solvent, choice of initiator, total solids level, type and amount of multi-ethylenically-unsaturated monomer, type and amount of chain transfer agent, initiator level and reaction conditions. Particle sizes can be determined using standard dynamic light scattering techniques. Correlation functions can be converted to hydrodynamic sizes using LaPlace inversion methods, such as CONTIN.

Initiators useful in the free radical polymerization of the present invention include, for example, one or more of: peroxyesters, dialkyl peroxides, alkyl hydroperoxides, persulfates, azo initiators, redox initiators and the like. Useful free radical initiators include, but are not limited to: benzoyl peroxide, t-butyl peroctoate, t-amyl peroxypivalate, cumene hydroperoxide, and azo compounds such as azoisobutylnitrile and 2,2'-azobis (2-methylbutanenitrile). It is preferred that the free radical initiator is t-amyl peroxypivalate. The amount of the free radical initiator used is typically from 0.05 to 10% by weight, based on the weight of total monomer.

In the various embodiments of the present invention, unless indicated otherwise, the PNPs have a mean diameter in the range of from 1 to 50 nm, preferably in the range of from 1 to 40 nm, more preferably in the range of from 1 to 30 nm, even more preferably in the range of from 1 to 25 nm, further more preferably in the range of from 1 to 20 nm, even further more preferably in the range of from 1 to 15 nm, substantially more preferably in the range of from 1 to 10 nm, and most preferably in the range of from 2 to 8 nm.

Chain transfer reagents can optionally be used to prepare the polymers useful in the present invention. Suitable chain transfer agents include, for example: alkyl mercaptans such as dodecyl mercaptan, and aromatic hydrocarbons with activated hydrogens such as toluene.

Unless indicated otherwise, the various embodiments of the present invention include PNPs having an apparent GPC weight average molecular weight in the range of 500 to 10,000,000, typically in the range of 1,000 to 5,000,000, more typically in the range of from 2,000 to 2,000,000, even more typically in the range of from 3,000 to 1,000,000, even further typically in the range of from 4,000 to 750,000, even more further typically in the range of from 5,000 to 600,000, substantially more typically in the range of from 10,000 to 500,000 and most typically in the range of from 15,000 to 400,000 g/mol.

As used herein, "apparent weight average molecular weight" is related to the size of the PNP particles in solution. The GPC elution times of the PNPs thereby provide an indication of an apparent weight average molecular weight measurement, and not necessarily an absolute weight average molecular weight measurement. As used herein, the term "molecular weight", when describing the PNPs, refers to the apparent molecular weight one obtains using standard gel permeation chromatography methods, e.g., using THF solvent at 40C, 3 Plgel Columns (Polymer Labs), 100 Angstrom, 10^3, 10^4 Angstroms, 30 cm long, 7.8 mm ID, 1 mil/min, 100 microliter injection volume, calibrated to narrow polystyrene standards using Polymer Labs CALIBRE™ software. Variations to such chromatography methods are known in the art for measuring a variety of apparent molecular weight ranges (e.g., below 1,000 g/mol or above 1,000,000 g/mol).

In one embodiment, the PNPs can be post-functionalized (i.e., functionalized after polymerization of the PNPs). PNPs can be post-functionalized by varieties of techniques known in the art for post-functionalizing polymeric materials. Post-functionalization of the PNPs may be advantageous, such as improving compatibility of the PNPs with plastics resins, plastics additives, or with other ingredients in the plastic composition.

In one embodiment, PNPs containing polymerized units derived from at least one carboxylic acid monomers, such as MAA, can be used as chemical sites for post-functionalization.

In one embodiment, PNPs containing double bonds, e.g., the residual double bonds present in the PNPs after polymerization of the PNPs is completed, can be used as post-functionalization sites. For example, mercaptoacetic acid can be added to the double bonds to impart improved dispersancy of plastics additive particulates (e.g., fillers, pigments, and colorants) in plastics.

In one embodiment, the multiethylenically unsaturated monomer can be selected from DVB, TVB, and pentaerithritol tetramethacrylate. If it is desired to assure that a significant amount of residual double bonds are present in the PNPs, the weight fraction of multi-ethylenically unsaturated monomer can be increased to 50% or more. This will allow subsequent addition of mercaptoacetic acid or of $H_2S$ or of a PH-containing compound to incorporate additional functionality as noted above. Employing high levels of DVB can allow the functionalization of the residual double bonds, preferably by epoxidation, to provide PNPs that can scavenge HCl and thereby function as thermal stabilizers for chlorinated resins such as PVC.

The PNPs are desirably discrete or unagglomerated, dispersible, miscible, or otherwise compatible with/in the plastic composition. The compatibility of the PNPs with the balance of the plastic composition is typically determined by a substantial matching of their solubility parameters, such as the Van Krevelen parameters of delta h and delta v. See, for example, Van Krevelen et al., *Properties of Polymers. Their Estimation and Correlation with Chemical Structure*, Elsevier Scientific Publishing Co., 1976; Olabisi et al., *Polymer-Polymer Miscibility*, Academic Press, NY, 1979; Coleman et al., *Specific Interactions and the Miscibility of Polymer Blends*, Technomic, 1991; and A. F. M. Barton, *CRC Handbook of Solubility Parameters and Other Cohesion Parameters*, $2^{nd}$ Ed., CRC Press, 1991. Delta d is a measure of the dispersive interaction of the material, delta p is a measure of the polar interaction of the material, delta h is a measure of the hydrogen bonding interaction of the material, and delta v is a measure of both the dispersive and the polar interaction of the material. SI units, $J^{1/2}/cm^{3/2}$, are used herein. Such solubility parameters can either be calculated, such as by the group contribution method, or determined by measuring the cloud point of the material in a mixed solvent system consisting of a soluble solvent and an insoluble solvent. The solubility parameter at the cloud point is defined as the weighted percentage of the solvents. Typically, a number of cloud points are measured for the material and the central area defined by such cloud points is defined as the area of solubility parameters of the material.

In one embodiment, a plastics additive PNP is provided that is not substantially compatible with a plastic resin. Such plastics additive PNP can be used as a lubricant for plastics resins. Typically, lubricant PNPs can be semi compatible, or incompatible in plastics resins during plastics processing conditions. While not being bound to a particular theory, the lubricant PNPs are not compatible with the plastics resin so that the PNP lubricant can migrate to the surfaces of the processing equipment to provide the lubricating action.

When the solubility parameters of the particle and plastic are substantially similar, the particle will be compatible in/with the plastic and phase separation and/or aggregation of the particle is less likely to occur. It is preferred that the solubility parameters, particularly delta h and delta v, of the particle and plastic are substantially matched.

PNPs can be incorporated into plastic compositions and plastics additive compositions using a variety of methods. The PNPs can be used as a dispersion in the polymerization medium for the plastic or plastics additive. For example, they can be dispersed in solvent or monomer, which is used for preparing the plastic or plastics additive. The PNPs can be isolated by, for example, vacuum evaporation, by precipitation into a non-solvent, and spray drying; the isolated PNPs can be subsequently redispersed in a medium appropriate for incorporation into a plastic.

The PNPs can be incorporated into a plastic by admixing the particles or a dispersion of the particles with other dissolved or dispersed polymers and/or other plastics adjuvants (i.e., plastics additives) as are well known to those skilled in the art. Additional components in the plastic composition, such as UV stabilizers, colorants such as pigments and dyes, light scattering agents, flame retardants, anti-static agents, PVC resin, matting agents, flow aids, processing aids, impact modifiers, lubricants, fillers, heat stabilizers, light stabilizers, and the like, can be blended, typically in powder or liquid form, with resin powders. Individual additives, i.e., UV light stabilizer, can be emulsified, added to plastic polymer dispersions and co-spray-dried. Alternatively, various emulsified additives, such as pigment dispersions, can incorporate PNPs, which can be added directly to resin powders, e.g., in a suitable mixing device that can transfer heat and mass (e.g., heat and remove water). Likewise, plastic wetcake, such as PVC wetcake, can also be blended with powder or aqueous-based PNP dispersions. Numerous combinations of mixing emulsion-based additives and powders followed by subsequent drying may be envisioned by one skilled in the art.

In one embodiment, PNP processing aids can be incorporated into one or more processes for preparing plastic compositions. At least one of these processes may involve suspension, solution, powder, spray, coating, emulsion, and various like liquid and solid systems for manufacturing plastics, such as by compounding of PVC pellets with PNP dispersed in a liquid. These processes can occur before, during, or after the synthesis of the plastic resin. While not being bound by a particular theory, the PNPs may migrate to the surfaces of particulate plastic composition components and can be carried into the compounding operations therewith. The PNPs can be incorporated with other modifiers such as impact modifiers. The compositions of the PNPs can also incorporate lubricant-imparting copolymerized monomers such as, for example, n-dodecyl and n-octadecyl methacrylate to impart both processing aid and intrinsic lubricity to the PNP/plastic resin blend compositions.

In another embodiment, a pelletized form of the PNPs is envisioned. Such pellets typically find uses in preparing thermoplastic film, sheet, and other various articles. Pellet-forms are typically more desirable than using a powder-form to avoid certain problems common to powders, such as dust formation. Accordingly, powders can be formed into pellets using any suitable plastics pelletization equipment and other various methods known in the plastics processing art. These pellet forming steps can be combined with the mixing step wherein the components of the plastic composition can be compounded (mixed) and pelletized using standard plastics processing equipment.

In one embodiment of the present invention, PNPs are incorporated in a plastic resin, such as a thermoplastic resin like PVC, at a level of 1–50 parts per hundred resin ("pphr"), preferably 2–30 pphr, and more preferably 4–20 pphr. The PNPs can improve impact strength of PVC. Where optically clear PVC plastic compositions are desired, the PNPs may also improve the optical clarity while improving impact strength relative to conventional impact modifiers having much larger particle sizes.

In one embodiment, PNPs are provided which improve the impact strength of plastics. In this embodiment, the PNPs will typically have a glass transition temperature ("Tg") less than 25° C., preferably less than 0° C., more preferably less than –20° C., even more preferably less than –40° C., and further more preferably less than –60° C. Plastics containing PNP plastics additives having a Tg less than –40° C. are particularly useful for providing "low temperature" impact strength in plastics, i.e. improved impact strength at use temperatures less than –20° C.

Various combinations of copolymerizable monomers and multi-ethylenically-unsaturated monomers that provide a Tg less than 25° C. are known (see, for example, Tg data available in "Polymer Handbook", Third edition, J. Brandrup, E. H. Immergut, Editors, John Wiley & Sons) and can be used for preparing PNPs having a Tg less than 25° C. PNPs which impart impact strength can typically include: (meth)acrylic polymers and copolymers, preferably copolymers containing at least 45 weight percent of units polymerized from butyl acrylate or 2-ethylhexyl acrylate; butadiene polymers and copolymers with other vinyl monomers; siloxane polymers and copolymers, and elastomeric polymers and copolymers, such as, for example, nitrile rubbers, EPDM, and EVA. PNPs containing polymerized units derived from a majority of siloxane monomers, e.g., dimethylsiloxane, can have a Tg typically less than –60° C., more typically less than –80° C., and even more typically less than –100° C.

In one embodiment of the present invention, PNPs are incorporated into plastic resin compositions. While any amount of PNPs in plastic resins are envisioned as useful materials, typically 0.1 to 99 wt %, preferably 0.2 to 90 wt %, more preferably from 0.5 to 75 wt %, even more preferably from 0.5 to 50 wt %, further more preferably from 0.5 to 30 wt %, of PNPs based on plastic resin can be used. In this embodiment, the plastic resin can be a thermoplastic resin or a thermoset resin.

In one embodiment of the present invention, PNPs are incorporated into polycarbonate resin composition. While any amount of PNPs in polycarbonate resins are envisioned as useful materials, typically 0.1 to 50 wt %, preferably 0.2 to 25 wt %, more preferably from 0.5 to 15 wt %, even more preferably from 0.5 to 10 wt %, and further more preferably from 0.5 to 5 wt %, of PNPs based on polycarbonate resin can be used. Preferably, a PNP composition such as (MMA/BA/TMPTMA) predominant in MMA is selected. Such polycarbonate plastic compositions can have improved impact strength relative to the same composition absent the PNPs with preservation of polycarbonate clarity.

In one embodiment of the present invention PNPs are incorporated into a nylon composition. While any amount of PNPs in nylon resins are envisioned as useful materials, typically 0.1 to 50 wt %, preferably 0.2 to 25 wt %, more preferably from 0.5 to 15 wt %, even more preferably from 0.5 to 10 wt %, and further more preferably from 0.5 to 5 wt %, of PNPs based on nylon resin can be used. Preferably, a PNP composition such as (MMA/BA/carboxylic acid monomer/TMPTMA); (MMA/BA/GMA/TMPTMA); or (MMA/BA/DMAEMA/TMPTMA) is selected.

In one embodiment of the present invention, PNPs and polymeric particles having a mean diameter larger than the PNPs can be blended and incorporated into a plastic resin, preferably PVC. The PNP/polymeric particle blend can be used as an impact modifier plastics additive composition known to those skilled in the art as a dual-mode impact modifier. The dual-mode impact modifier of the present invention can be incorporated in plastic resins in any amount, typically in the range of from 0.1 to 99 wt %, preferably in the range of from 0.2 to 90 wt %, more preferably in the range of from 0.3 to 80 wt %, even more preferably in the range of from 0.4 to 70 wt %, even further preferably in the range of from 0.5 to 60 wt %, even further more preferably in the range of from 0.6 to 50 wt %, and most preferably in the range of from 0.7 to 40 wt %.

In this embodiment, the amount of the PNPs in the PNP/polymeric particle blend can be in the range of from 1 to 99 wt %, preferably in the range of from 2 to 90 wt %, more preferably in the range of from 3 to 80 wt %, even more preferably in the range of from 4 to 70 wt %, even further preferably in the range of from 5 to 60 wt %, even further more preferably less than 50 Wt % of the particles being PNPs are used as the smaller mode. In embodiments useful as dual-mode impact modifiers, a PNP composition such as (MMA/BA/TMPTMA) predominant in MMA, EGMA/TMPTMA, or PPGMA/TMPTMA can be selected and combined with one or more of the known polymeric impact modifiers, such as core-shell impact modifiers (e.g., acrylic, MBS, ABS, ABA, MABS), chlorinated PE, graft copolymer, rubbery copolymers, and block copolymers (e.g., SIS and SEBS). Without being bound by mechanism it is believed that the PNPs may induce shear yielding/microcracks in some plastics, where the second, larger mode may operate in a crack-stopping mode or as a shear-yielding enhancer if it cavitates. The dual mode-impact modifier plastic composition can exhibit improved impact strength relative to the same composition absent the PNPs.

In one embodiment of the present invention PNPs can be incorporated into a thermoplastic resin, preferably PVC at a level of 0.1 to 15 pphr, preferably 0.1 to 2 pphr, more preferably 0.1 to 1 pphr, to provide improvement in the melt rheology of the resin, thereby acting as compositions known in the art as processing aids. PNPs having compositions including (meth)acrylic copolymers, optionally with other vinyl monomers, preferably those which contain at least 70 wt % MMA, and having a weight average molecular weight greater than 50,000 are preferred, and preferably greater than 500,000. The modified resin compositions can provide improved clear and transparent extruded and injection molded products.

In one embodiment of the present invention, PNPs can be incorporated into thermoset resins, preferably liquid-based epoxies or unsaturated polyesters, at a level of 2–30 pphr to provide improvement in impact strength with minimal increase in the viscosity of the overall composition. PNPs can be used in transparent gel coats where optical transparency is desired and also in reinforced thermoset composites containing reinforcing fiber.

In one embodiment of the present invention PNPs can be incorporated into thermoset resins at a level of 2–30 pphr to provide improvement in low shrinkage and surface smoothness of the cured resin, i.e., functioning as a low profile additive, with minimal increase in the viscosity of the overall composition. Improvement is seen relative to the larger particle size polymeric low profile additives in use.

In one embodiment of the present invention, PNPs can be incorporated into a thermoset resin at a level of 2–30 pphr to provide improvement in pigmentability of the resin. Improvement is seen relative to larger particle size polymeric additives such as, for example, styrene, poyvinylacetate, acrylic resins, and polyesters currently in use.

In one embodiment of the present invention PNPs can be incorporated into a plastic resin composition, preferably a crystallizable resin, e.g., a polyolefin, to act as a nucleating agent to promote crystallization of the plastic resin. Typically, the amount of nucleating-PNP that can be effective as a nucleating agent will be in the range of from 0.01 to 2 wt % PNPs based on resin. Typically, a PNP composition incorporating at least one multifunctional monomer copolymerized with styrene, 4-methylstyrene, isobornyl (meth)acrylate, fluorinated monomers such as ZONYL™ monomers or fluorinated ethylene derivatives, versatic acid unsaturated derivatives such as VEOVA™ monomers, or "medium cut" or "high cut" alkyl (meth)acrylate is selected when nucleating-PNPs. Plastic compositions containing nucleating-PNPs can exhibit higher crystallinity relative to the same composition absent the PNPs.

In one embodiment of the present invention, functionalized PNPs having complementary functional groups, the complementary functional groups being capable of interaction such as ionic or covalent reaction with each other, are incorporated into a plastic resin composition. Preferably 1 to 20 wt % PNPs based on plastic resin are used. Functionalized PNPs that are dispersible in resins, but have functional groups that can react with one another to form chains of particles for self assembly, are selected. This can be accomplished by mixing PNPs with functionality "A" (e.g., amine or acid) with PNPs with complementary functionality "B" (e.g., epoxy or anhydride). In this embodiment, much of the PNPs can include polymerized units derived from monomers that promote dispersibility in a given plastic resin (for example, LMA or SMA for polyolefins; MMA for acrylics; STY for styrenics;) in addition to at least one multi-ethylenically unsaturated monomer. In this embodiment, low levels of functional groups, preferably situated in the outer layer of the particle, can promote interparticle interaction. Alternatively, suitable low-molecular weight functional compounds or functionalized polymers, can be used as assembly-promoters, i.e., in promoting (macro)network formation. Plastic compositions containing such functionalized PNPs having complementary functional groups can exhibit improved rheology control, and/or reinforcement and/or improved transport properties relative to the same composition absent the PNPs.

In one embodiment of the present invention, PNPs can be incorporated into plastic resin such as, for example, polycarbonate and nylon. Preferably 0.5 to 20 wt %, more preferably 0.5 to 5 wt %, PNPs based on resin are used. Preferably, a PNP composition such as (MMA/BA/TMPTMA) predominant in MMA is selected. The PNPs can also include a liquid-like or oligomeric substance for crack healing upon polymer fracture (fatigue of polymer structures). Methods and oligomeric substances which are useful in the present invention for healing cracks in plastic materials are disclosed in Nature, Vol. 409, 794 (2001).

In one embodiment of the present invention, polar PNPs can be prepared for use as plastics additives in plastics that are polar in nature (e.g., plastics having a delta h value greater than zero, a delta v value greater than zero, or both delta h and delta v values greater than zero). Such polar PNPs can be prepared in aqueous and in mixed aqueous/water-soluble solvent media. For example, polar PNPs can be prepared in water-compatible solvent or water, which can incorporate hydrogen-bonding or polar polymerized units derived from polar monomers (e.g., monomers having a delta h value, a delta v value greater than zero, or both delta h and delta v values greater than zero). These polar PNPs are particularly useful as processing aids for polar polymers such as PVOH, starch, starch/PVOH blends, other cellulosics, combinations of these with nylons and other polyamides, proteinaceous blends, lignins, and various melt-processable biologically derived plastic materials. Without being bound to a particular theory, such polar PNPs can be used as plastics additives in plastics in which hydrogen bonding (and to a limited extent by chemical reactive polycondensation) is the primary mechanism for compatibilization.

In addition to the polar polymers described herein, many other polar polymers can be advantageously modified by incorporating polar PNPs. These include: polyamides, polyesters, polyurethanes, polyureas, poly(vinyl esters), polyacrylics, polystyrene/acrylic copolymers, and various combinations of graft-copolymers, block-copolymers, and blends of polymers thereof.

In one embodiment of the present invention, there is a method for providing a plastic composition. In this embodiment, the method includes the steps of forming PNPs according to any of the mentioned processes described herein, and combining the PNPs with at least one plastic resin. In this embodiment, the PNPs can be combined with the plastic resin using any of the known methods in the plastics processing art for compounding and blending plastic compositions.

In the embodiments providing a method for providing a plastic composition, the plastic composition may further include at least one plastics additive. In this embodiment, any known plastics additive can be combined with PNPs. Typically, the PNPs are first combined with at least one other plastics additive prior to combining the PNPs with the at least one plastic resin. Preferably, the PNPs are first blended with the other plastics additive in a liquid medium. Preferably, the liquid medium is aqueous-based; more preferably, a majority of the liquid medium is water. This blending step can be carried out by a variety of known blending steps in the art. Typically, one of the following methods is used: co-spray drying PNPs with the other plastics additive, mixing and drying PNPs with the other plastics additive, coagulation of the PNPs with the plastics additive, synthesizing the other plastics additive in the presence of the PNPs, and synthesizing the PNPs in the presence of the other plastics additive.

In one embodiment, the PNPs and the plastic resin can be mixed with other plastics additives or resins, by melt-blending. In this embodiment, melt-blending is useful for forming a "one-pack" or concentrate type plastics additive. Concentrate-type plastics additives typically contain plastics additives and plastic resin, wherein the plastics additives makes up greater than 20 wt. %, preferably greater than 30 wt. %, and more preferably greater than 40 wt. % of the total weight.

The following examples are presented to illustrate further various aspects of the present invention.

EXAMPLE 1

Preparation of PNPs

A 500 mL reactor was fitted with a thermocouple, a temperature controller, a purge gas inlet, a water-cooled reflux condenser with purge gas outlet, a stirrer, and an addition funnel. To the addition funnel was charged 201.60 g of a monomer mixture consisting of 18.00 g methyl methacrylate (100% purity), 2.00 g diethyleneglycol dimethacrylate (100% purity), 1.60 g of a 75% solution of t-amyl peroxypivalate in mineral spirits (Luperox 554-M-75), and 180.00 g diisobutyl ketone ("DIBK"). The reactor, containing 180.00 g DIBK was then flushed with nitrogen for 30 minutes before applying heat to bring the contents of the reactor to 75° C. When the contents of the reactor reached 75° C., the monomer mixture in the addition funnel was uniformly charged to the reactor over 90 minutes. Thirty minutes after the end of the monomer mixture addition, the first of two chaser aliquots, spaced thirty minutes apart and consisting of 0.06 g of a 75% solution of t-amyl peroxypivalate in mineral spirits (Luperox 554-M-75) and 2.00 g DIBK, was added. At the end of the second chaser aliquot, the contents of the reactor were held 2/2 hours at 80° C. to complete the reaction. The resulting polymer was isolated by precipitation with heptane, collected by filtration and dried under vacuum to yield a white powder. This material was redissolved in propyleneglycol monomethylether acetate. The PNPs thus formed had a particle size distribution of from 0.8 to 5.0 nm with mean of 1.4 nm as determined by dynamic laser light scattering and a molecular weight of about 22,642 g/mol with a number average molecular weight of about 14,601 g/mol and Mw/Mn distribution of 1.6 as measured by GPC.

EXAMPLE 2

Preparation of PNP—AAEM/ALMA Copolymer by a Semi-batch Emulsion Polymerization Process A monomer emulsion was made from a mixture of 17 g deionized water, 8.85 g of 28% w/w solids ammonium lauryl sulfate ("ALS"), 12.4 g acetoacetoxyethyl methacrylate ("AAEM"), and 1.78 g allyl methacrylate ("ALMA"). A reaction kettle was then prepared with 600 g deionized water, 15.0 g of 28% w/w solids ALS, and 0.15 g ammonium persulfate ("APS") in 1 mL deionized water. The reaction kettle was heated to 90° C. while being purged with nitrogen. One half of the monomer emulsion was added to the reaction kettle with stirring at 200 rpm. After 20 minutes, the remaining monomer emulsion was added. The kettle temperature was kept at 90° C. for 30 minutes, cooled to 55° C., and then a solution of 0.02 g t-butyl hydroperoxide ("t-BHP") in 1 mL of deionized water and a solution of 0.010 g sodium sulfoxylate formaldehyde ("SSF") in 1 mL of deionized water were added respectively. The reaction was then cooled to ambient temperature and the emulsion was filtered through 400 and 100 mesh sieves respectively.

The sample was isolated from water by freeze-drying to produce a white friable, free flowing powder. The resulting white powder was washed with copious amounts of doubly distilled and deionized water to remove most of the surfactant.

EXAMPLE 3

Preparation of PNP—AAEM/ALMA Copolymer Prepared by a Batch Emulsion Polymerization Process A monomer emulsion was made from a mixture of 17 g deionized water, 8.85 g of 28% w/w solids ALS, 12.4 g AAEM, and 1.78 g ALMA in a bottle. A reaction kettle was then prepared with 600 g deionized water, 15.0 g of 28% w/w solids ALS, and 0.15 g APS in 1 mL deionized water. The reaction kettle was heated to 90° C. while being purged with nitrogen. The monomer emulsion was added all at once to the reaction kettle with stirring at 200 rpm. After 30 minutes, the temperature of the reaction flask was cooled to 75° C., and then a solution of 0.02 g t-BHP in 1 mL of deionized water was added. The reaction was cooled further to 55° C., and a solution of 0.010 g SSF in 2 mL of deionized water was added. The reaction was cooled to ambient temperature and the emulsion was filtered through 400 and 100 mesh sieves respectively.

EXAMPLE 4

Preparation of PNPS Prepared by a Gradual-add Polymerization Process

A monomer emulsion was made from a mixture of 100 g water, 1.60 g of 28% w/w solids ALS, 68 g ethyl acrylate ("EA"), 17 g methyl methacrylate ("MMA"), 12.5 g divinyl benzene ("DVB"), and 5 g methacrylic acid ("MAA"). A reaction kettle containing 445 g water, 22.2 g of 28% w/w solids ALS and 0.37 g APS was heated to 85° C. under a nitrogen atmosphere. The monomer emulsion was fed to the kettle over 90 minutes. The reaction was held at 85° C. for 30 minutes after the end of the feed, and then cooled to 65° C. After cooling, 1.33 g of 10% iron sulfate ($FeSO_4$) was added. After 1 minute, 0.2 g of 70% t-BHP was added and after 2 minutes 0.10 g of 100% isoascorbic acid ("IAA") and the reaction held for 15 minutes. A second chaser system was added in the same sequence and over the same time period. The reaction was then cooled to ambient temperature and filtered through a 400 mesh sieve.

EXAMPLE 5

Preparation of Various PNPs

PNP Compositions are Reported in Table 5.1. These polymers were prepared according to the general procedures of Examples 1–4. The abbreviation "Mw" refers to the weight average molecular weight and the term "Mn" refers to the number average molecular weight. The term "Dist" refers to the ratio of Mw/Mn. The molecular weights were measured using a standard GPC method with tetrahydrofuran as the solvent.

TABLE 5.1

PNP compositions

| Ex. 5- | Composition | Ratio | Mw | Mn | Dist |
|---|---|---|---|---|---|
| 1 | HEMA/DEGDMA | 90/10 | | | |
| 2 | MMA/DEGDMA | 90/10 | | | |
| 3 | MMA/DEGDMA | 90/10 | 19073 | 11183 | 1.7 |
| 4 | MMA/DEGDMA | 90/10 | 644 | 221 | 2.9 |
| 5 | MMA/DEGDMA | 90/10 | 7710 | 3989 | 1.9 |
| 6 | MMA/MAPS/DEGDMA | 70/20/10 | 10640 | 4254 | 2.5 |
| 7 | MMA/MAPS/DEGDMA | 80/10/10 | 12819 | 8091 | 1.6 |
| 8 | MMA/MAPS/DEGDMA | 60/30/10 | | | |
| 9 | MMA/MAPS/DEGDMA | 40/50/10 | 43667 | 9047 | 4.8 |
| 10 | MMA/MAPS/DEGDMA | 20/70/10 | 166432 | 7404 | 22.5 |
| 11 | MAPS/DEGDMA | 90/10 | 11683 | 3484 | 3.4 |
| 12 | MMA/MAPS | 88.9/11.1 | 15965 | 7424 | 2.2 |
| 13 | BA/DEGDMA | 90/10 | 51007 | 29065 | 1.8 |
| 14 | MMA/MAPS/PETTA | 80/10/10 | | | |
| 15 | MMA/MAPS/PPG4000DMA | 80/10/10 | | | |
| 16 | MMA/MAPS/DPEPA | 80/10/10 | | | |
| 17 | MMA/MAPS/TMPTMA | 80/10/10 | | | |
| 18 | MMA/MAPS/DEGDMA | 75/10/15 | | | |

TABLE 5.1-continued

PNP compositions

| Ex. 5- | Composition | Ratio | Mw | Mn | Dist |
|---|---|---|---|---|---|
| 19 | MMA/MAPS/DEGDMA | 85/10/5 | | | |
| 20 | MMA/MAPS/DVB | 10/60/30 | 95613 | 12003 | 8.0 |
| 21 | MMA/MAPS/DVB | 20/60/20 | 110422 | 19814 | 5.6 |
| 22 | MMA/MAPS/DVB | 25/60/15 | | | |
| 23 | MMA/MAPS/DVB | 30/60/10 | | | |
| 24 | MMA/MAPS/DEGDMA | 20/70/10 | 35249 | 7438 | 4.7 |
| 25 | MMA/MAPS/DEGDMA | 30/60/10 | 35105 | 7003 | 5.3 |
| 26 | MMA/MAPS/DVB | 10/80/10 | 331732 | 29918 | 11.1 |
| 27 | STY/MAPS/DVB | 30/60/10 | 38455 | 12320 | 3.1 |
| 28 | BA/MAPS/DVB | 30/60/10 | 499094 | 36317 | 13.7 |
| 29 | BA/MAPS/DVB | 10/80/10 | 312848 | 16102 | 19.4 |
| 30 | BA/TMSMA/DVB | 10/80/10 | 674730 | 30989 | 21.8 |
| 31 | BA/MOPTSOMS/DVB | 10/80/10 | 97530 | 12154 | 8.0 |
| 32 (a) | BA/MOPMDMOS/DVB | 10/80/10 | 363561 | 37553 | 9.7 |
| 33 | BA/MAPS/TAT | 10/80/10 | 12201 | 5182 | 2.4 |
| 34 | ALMA/BA/DVB | 10/80/10 | | | |
| 35 | IBOMA/MAPS/DVB | 10/80/10 | | | |
| 36 | BA/DVB | 90/10 | 223436 | 29309 | 7.6 |
| 37 | BA/PGDMA | 90/10 | 26797 | 8242 | 3.3 |
| 38 | BA/ALMA | 90/10 | 104529 | 15967 | 6.5 |
| 39 | BA/TMPTMA | 90/10 | 39638 | 16306 | 2.4 |
| 40 | BA/DPEPA | 90/10 | 103945 | 18702 | 5.6 |
| 41 | EHA/DVB | 90/10 | | | |
| 42 | EHA/ALMA | 90/10 | | | |
| 43 | EHA/TMPTMA | 90/10 | | | |
| 44 | EHA/DPEPA | 90/10 | | | |
| 45 | STY/DVB | 90/10 | | | |
| 46 | STY/ALMA | 90/10 | | | |
| 47 | EHA/STY/ALMA | 20/70/10 | | | |
| 48 | EHA/STY/ALMA | 45/45/10 | | | |
| 49 | MMA/DEGDMA | 90/10 | 22642 | 14601 | 1.6 |

(a) measured particle size was ca. 29 nm; The synthetic procedures of Examples 1–4 were also generally followed to prepare a PNP having a measured Mw of ca. 710,000 g/mol and a measured particle size of ca. 47 nm.

EXAMPLE 6

Preparation of PVC Composition Containing a PNP Processing Aid

The synthetic procedures of Example 5 are generally followed. MMA (90 parts) and TMPTMA (10 parts) mixed with t-amyl peroxypivalate (0.5 parts) are added in the course of 1 hour to MIBK (200 parts) under reflux. Heating is continued for an additional hour to provide a dispersion of PNPs in MIBK which are useful as processing aids. The PNPs can be isolated from the MIBK and incorporated into a PVC resin to provide improved processing rheology relative to the rheology of the PVC alone.

EXAMPLE 7

Various PNPs Useful as Plastics Additives

The synthetic procedures of Example 5 are generally followed for preparing various PNPs. The monomer compositions which are used for preparing various 5 to 15 nm PNPs, and their use as plastics additives are indicated in the following table.

| Ex 7- | LMA | TMPTMA | IBOMA | MAA | AA | GMA | MMA | BA | Plastic Additive Use |
|---|---|---|---|---|---|---|---|---|---|
| 1 | 90 | 10 | | | | | | | PP Nucleating Agent |
| 2 | | 10 | 90 | | | | | | PP Nucleating Agent |
| 3 | 89 | 10 | | 1 | | | | | PP Nucleating Agent & Rheology Modifier |
| 4 | 84 | 10 | | 5 | | | | | PP Nucleating Agent & Rheology Modifier |
| 5 | 89 | 10 | | | 1 | | | | PP Nucleating Agent & Rheology Modifier |
| 6 | 84 | 10 | | | 5 | | | | PP Nucleating Agent & Rheology Modifier |
| 7 | 89 | 10 | | | | 1 | | | PP Nucleating Agent & Rheology Modifier |
| 8 | 84 | 10 | | | | 5 | | | PP Nucleating Agent & Rheology Modifier |
| 9 | | 10 | 89 | 1 | | | | | HDT Agent for PVC |
| 10 | | 10 | 84 | 5 | | | | | HDT Agent for PVC |
| 11 | | 10 | 89 | | 1 | | | | HDT Agent for PVC |
| 12 | | 10 | 84 | | 5 | | | | HDT Agent for PVC |
| 13 | | 10 | 89 | | | 1 | | | HDT Agent for PVC |
| 14 | | 10 | 84 | | | 5 | | | HDT Agent for PVC |
| 15 | | 10 | | | | | 88 | 2 | Processing Aid |
| 16 | | 10 | | | | | 85 | 5 | Processing Aid |
| 17 | | 10 | | | | | | 90 | Impact Modifier |
| 18 | | 10 | | | | | 45 | 45 | Impact Modifier |
| 19 | | 10 | | | 5 | | | 85 | Impact Modifier |
| 20 | | 10 | | 1 | | | 87 | 2 | Processing Aid for PET and PBT |
| 21 | | 10 | | | 1 | | 87 | 2 | Processing Aid for PET, PBT, Nylon-6 |
| 22 | | 5 | | | 1 | | 92 | 2 | Processing Aid for Nylon 6 |
| 23 | | 10 | | 0.5 | | | 87 | 2.5 | Processing Aid for Nylon-66 |
| 24 | | 10 | | 10 | | | 78 | 2 | Processing Aid for PVOH |
| 25 | | 10 | | 10 | | | 60 | 20 | Processing Aid for Starch and PVOH/Starch |
| 26 | | 10 | | 5 | | | 75 | 10 | Processing Aid for Polyurethane |
| 27 | | 10 | | | | | 25 | 65 | Impact Modifier for Unsaturated Polyesters |
| 28 | | 10 | | 4 | | | 20 | 66 | Plastic Pigment Dispersant |
| 29* | | 10 | | | | | 80 | 5 | *+5 HEMA, Processing Aid for PBT, PET, and Polyurethane |

What is claimed is:

1. A plastic composition, comprising: at least one plastic resin and PNPs, said PNPs having a mean diameter in the range of from 1 to 50 nanometers, said PNPs comprising as polymerized units at least one multi-ethylenically-unsaturated monomer, wherein the amount of the at least one multi-ethylenically-unsaturated monomer used in preparing the PNPs is at least 50 weight percent based on total weight of monomers used for providing the polymerized units.

2. The plastic composition of claim 1, wherein the at least one plastic resin comprises at least one of the following: a chlorinated resin, a polyefin resin, a polycarbonate resin, a thermoset resin, a polar polymer resin, an acrylic resin, a vinylaromatic resin, a polyester resin, and combinations of resins thereof.

3. The plastic composition of claim 1, wherein the PNPs further comprise at least one polymerized unit comprising at least one functionality.

4. The plastic composition of claim 1, wherein the PNPs have a glass transition temperature lower than 25° C.

5. A method for providing a plastic composition, comprising the steps of:
    forming PNPs having a mean diameter in the range of from 1 to 50 nanometers, said PNPs comprising as polymerized units at least one multi-ethylenically-unsaturated monomer, wherein the amount of the at least one multi-ethylenically-unsaturated monomer used in preparing the PNPs is at least 50 weight percent based on total weight of monomers used for providing the polymerized units; and
    combining said PNPs with at least one plastic resin.

6. The method for providing a plastic composition of claim 5, wherein the plastic composition further comprises at least one other plastics additive, wherein the PNPs are first combined with the at least one other plastics additive prior to combining the PNPs with the at least one plastic resin.

7. The method for providing a plastic composition of claim 6, wherein the PNPs are first blended with said other plastics additive in a liquid medium by at least one of the following methods: co-spray drying said PNPs with said other plastics additive, mixing and drying said PNPs with said other plastics additive, coagulation of said PNPs with said other plastics additive, synthesizing said plastics additive in the presence of said PNPs, and synthesizing said PNPs in the presence of said plastics additive.

8. A plastics additive composition, comprising: at least one plastics additive and PNPs, said PNPs having a mean diameter in the range of from 1 to 50 nanometers, said PNPs comprising as polymerized units at least one multi-ethylenically-unsaturated monomer, wherein the amount of the least one multi-ethylenically-unsaturated monomer used in preparing the PNPs is at least 50 weight percent based on total weight of monomers used for providing the polymerized units.

9. The plastics additive composition of claim 8, wherein the at least one plastics additive comprises polymer particles having a mean diameter larger than 50 nanometers.

* * * * *